(12) United States Patent
Van Merksteijn

(10) Patent No.: US 8,535,781 B2
(45) Date of Patent: Sep. 17, 2013

(54) FRICTION RESISTANCE REDUCING LAYER

(75) Inventor: Jacobus Lambertus Van Merksteijn, Zermatt (CH)

(73) Assignee: Kick Off Ltd., The Valley (AI)

( * ) Notice: Subject to any disclaimer, the term of this patent is extended or adjusted under 35 U.S.C. 154(b) by 644 days.

(21) Appl. No.: 12/669,706

(22) PCT Filed: Jul. 21, 2008

(86) PCT No.: PCT/NL2008/000179
§ 371 (c)(1),
(2), (4) Date: Jun. 23, 2010

(87) PCT Pub. No.: WO2009/014425
PCT Pub. Date: Jan. 29, 2009

(65) Prior Publication Data
US 2010/0285278 A1    Nov. 11, 2010

(30) Foreign Application Priority Data

Jul. 24, 2007 (NL) .................................... 1034178
Mar. 27, 2008 (NL) .................................... 1035216

(51) Int. Cl.
*B32B 3/28* (2006.01)
*B32B 3/30* (2006.01)
*B32B 3/00* (2006.01)

(52) U.S. Cl.
USPC .......................................... 428/167; 428/156

(58) Field of Classification Search
USPC .................. 428/156, 167; 296/180.1, 181.5; 244/130
See application file for complete search history.

(56) References Cited

U.S. PATENT DOCUMENTS

| | | | |
|---|---|---|---|
| 2,899,150 A | 8/1959 | Ellis, Jr. | |
| 4,180,290 A | 12/1979 | Drews | |
| 4,284,302 A | 8/1981 | Drews | |
| 4,907,765 A | 3/1990 | Hirschel et al. | |
| 5,114,099 A | 5/1992 | Gao | |
| 5,133,519 A | 7/1992 | Falco | |
| 5,797,414 A | 8/1998 | Sirovich et al. | |
| 6,570,333 B1 | 5/2003 | Miller et al. | |

FOREIGN PATENT DOCUMENTS

| | | |
|---|---|---|
| BE | 1003326 A6 | 2/1992 |
| EP | 1283163 A2 | 2/2003 |
| RU | 2094313 C1 | 10/1997 |

*Primary Examiner* — Catherine A Simone
(74) *Attorney, Agent, or Firm* — The Webb Law Firm

(57) ABSTRACT

The present invention relates to a layer for reducing the friction resistance of a fluid relative to an object and for improving the contact of a boundary layer of the fluid flowing past, and thereby increasing the lift, comprising a wave-like approach flow surface repeating in a first direction which comprises means for transporting fluid from the boundary layer of the fluid flowing past to cavities in the wave-like approach flow surface. The present invention further relates to a method for manufacturing such a layer.

21 Claims, 2 Drawing Sheets

FRICTION RESISTANCE REDUCING LAYER

BACKGROUND OF THE INVENTION

1) Field of the Invention

The present invention relates to a layer for reducing the friction resistance of a fluid relative to an object and for improving the contact of a boundary layer of the fluid flowing along the object, and thereby increasing the lift. The invention further relates to a method for manufacturing such a layer.

2) Description of the Prior Art

The efficiency of many practical applications can be improved by reducing the friction resistance between a fluid and an object. On the one hand a vehicle such as an aircraft, boat or automobile can displace more efficiently through the fluid surrounding it, this having a favourable effect on the performance and/or the energy consumption of the vehicle.

In addition to increasing the efficiency of vehicles, a reduced friction resistance between a fluid and an object provides many other practical possibilities, such as for instance increasing the efficiency of transport of a fluid through a pipe system. Objects such as buildings will also be less wind-sensitive if the friction resistance is reduced, and the efficiency of wind turbines can be improved by increasing the lift.

An object of the present invention is to provide a layer with which the friction resistance of a fluid can be reduced relative to an object and/or with which the lift of the object relative to the fluid flowing past can be increased.

SUMMARY OF THE INVENTION

Said object is achieved with the layer according to the present invention, comprising a wave-like approach flow surface repeating in a first direction which comprises means for transporting fluid from a boundary layer of the fluid flowing past to cavities in the wave-like approach flow surface.

Because fluid is transported from the boundary layer to cavities in the wave-like approach flow surface, release of the boundary layer will be prevented. The point of transition between laminar and turbulent flow will hereby be displaced downstream, and a larger part of the object will be subjected to a lamina flow, this increasing the lift of the object relative to the fluid because the underpressure is decreased.

In a preferred embodiment the wave-like approach flow surface takes the form of breaking waves, i.e. a form corresponding to that of forward rolling waves in the sea. This wave form is particularly advantageous in the case the fluid generates an overpressure on the layer. In the case of an underpressure being generated by the fluid, a substantially cycloid wave form is desirable. These waves comprise a wave top which overhangs some distance relative to the cavity situated downstream of the wave top, i.e. the space downstream below the wave top. Referring to a wave in the sea, this is the space of which wave surfers make use.

Owing to this characteristic wave form there can occur in the cavities situated downstream of the wave top one or more vortices which transport fluid from the boundary layer to the cavities in the wave-like approach flow surface. This pumping action is created by an underpressure generated by the vortices rotating at high speed in the cavities. Bernoulli teaches that a higher speed is associated with a lower pressure.

In another embodiment the cavities in the wave-like approach flow surface are feather-shaped. Owing to these feather-shaped waves the fluid in the cavities can be discharged in the same direction as the flow direction of the fluid. It is preferred here that the wave-like surface is designed such that a number of feather shapes are formed lying against each other. At the contact surfaces of the feather shapes the fluid can then leave the cavity and be entrained in the main fluid flow.

In another preferred embodiment the wave form varies over the surface of the layer. The advantage hereof is that the wave form can be adapted to the local flow characteristics of the fluid. For instance in the case of an aircraft wing the flow of the fluid on the front side differs from the flow on the top side and on the underside of the wing. By now modifying the wave form it is possible to have a wave form over the surface of the layer which is adapted to local conditions, whereby an optimum situation can be created at local level.

In a further preferred embodiment the waves comprise a distance between the wave tops which is adjusted to the resonance frequency and the desired speed of the fluid flowing past. The resonance frequency for air is about 483 kHz. The precise value will vary with the pressure and temperature Assuming 483 kHz, each frequency of 483/x, or 483*x, wherein x is a whole number, such as x=1, 2, 4, 8, 16, . . . , produces a frequency applicable to the invention. The invention is thus elucidated hereinbelow in an exemplary embodiment wherein for air the frequency of 483 kHz/8=∀60 kHz is applied.

In a further preferred embodiment the layer further comprises means for accelerating the boundary layer of the fluid flowing past, wherein the means comprise for instance a form displacing "the fluid flowing past". Exemplary embodiments are for instance displacing elements such as ridges, grooves arranged in the surface, or giving the approach flow surface an undulating form.

In a further preferred embodiment the layer further comprises means for aligning the boundary layer of the fluid flowing past. The forms, for instance the grooves, displacing "the fluid flowing past" are oriented such that the fluid is guided in the desired flow direction.

In yet another preferred embodiment the forms displacing "the fluid flowing past" form an angle of between 0° and 60°, preferably between 0° and 45°, and more preferably of about 45° with the approach flow direction of the fluid. These angles have been found to be particularly suitable for providing desired tornadoes.

In a further preferred embodiment the layer further comprises means for ionizing the boundary layer of the fluid flowing past, such as for instance an approach flow surface manufactured from Teflon or other thin, hard layer. The layer preferably has dirt-repelling and self-cleaning properties, for instance under the influence of UV light. Dust particles ionized in the airflow can be repelled, whereby the occurrence of contamination can be reduced. In addition, due to its electrical charge the ionized boundary layer can be attracted or repelled, and decelerated or accelerated, when the charge of its surroundings—such as that of the approach flow surface—is regulated. An ionized tornado has the further advantage of behaving differently from the surrounding neutrally charged fluid.

The present invention also relates to a method for manufacturing a layer for the purpose of reducing the friction resistance of a fluid relative to an object as specified above, comprising the step of machining the layer with one or more lasers. Owing to the characteristic wave form of the preferred embodiment of the present invention—wherein the wave top overhangs the cavity located downstream—it is no longer possible to manufacture the layer by means of a punching process. The wave form according to the invention is therefore manufactured by machining the basic material from which the layer is built up with one or more lasers, in particular machining the material under the wave tops where the cavities have to be formed.

Because the manufacture of a layer according to the present invention using lasers is very time-consuming, a large number of lasers, for instance more than a hundred or even more than a thousand, are preferably employed simultaneously. Material under the wave tops can thus be machined away with sufficient speed.

BRIEF DESCRIPTION OF THE DRAWINGS

Preferred embodiments of the present invention are further elucidated in the following description on the basis of the drawing, in which.

DETAILED DESCRIPTION OF THE INVENTION

Figure 1:
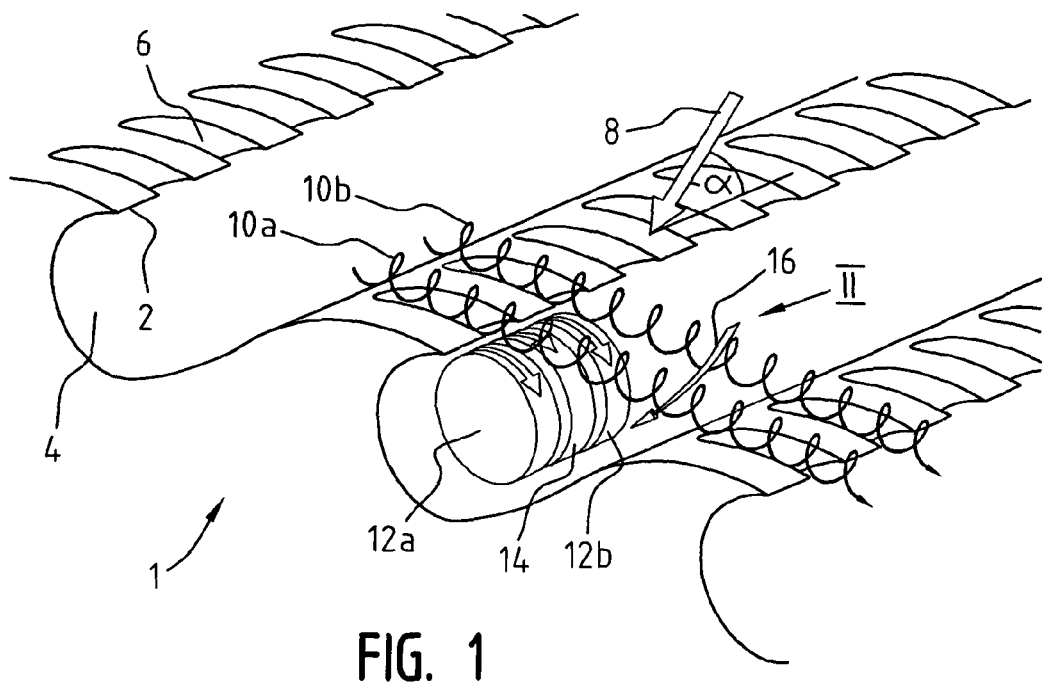
FIG. 1 is a perspective view of a wave-like approach flow surface according to the present invention.
Figure 2:
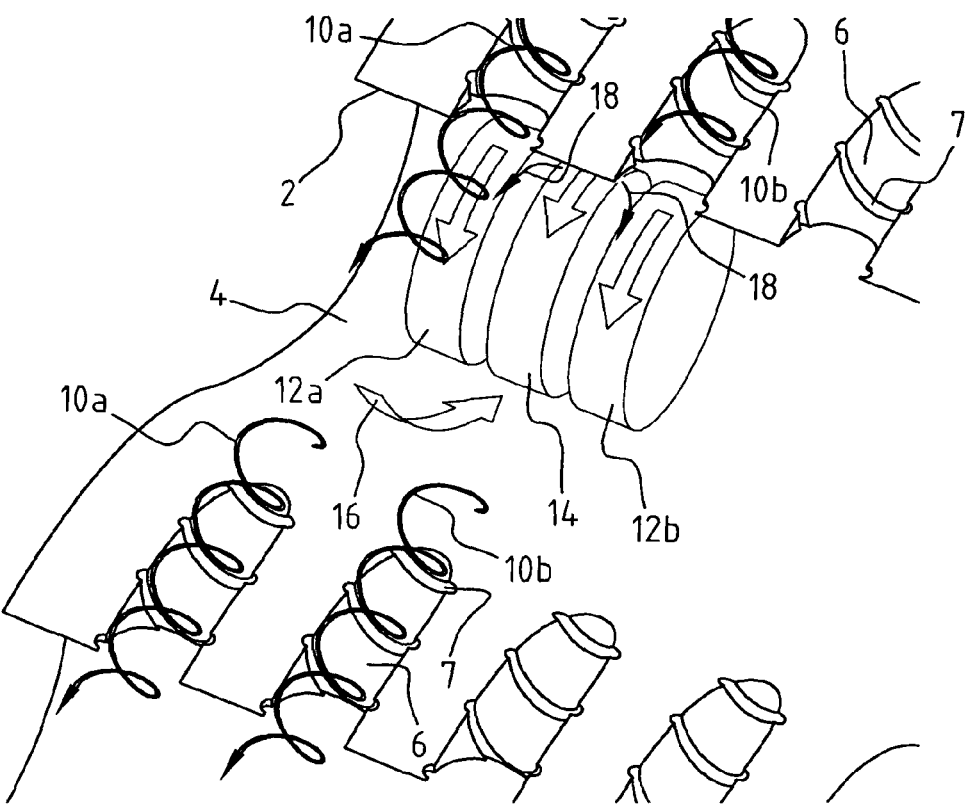
FIG. 2 is a perspective view in detail of the approach flow surface shown in FIG. 1.

The approach flow surface 1 with repetitive wave form shown in FIG. 1 has overhanging wave tops 2 and cavities 4 located downstream thereof. Close to wave tops 2 the approach flow surface is provided with grooves 6 which accelerate and also guide the air flowing thereover in a desired direction. This creates parallel oriented accelerated airflows 10a, 10b which are set into rotation by small grooves 7 arranged in grooves 6, wherein so-called "tornadoes" are created. With a correct choice of the rotation direction of the small grooves 7 arranged in grooves 6 the tornadoes can be brought into a desired rotation direction. Because the accelerated airflows 10a, 10b rotate, they are more stable.

The distance between wave tops 2—in the flow direction of airflows 10a, 10b—is chosen such that at each subsequent downstream groove 6 the accelerated air comes out onto the following downstream wave top 2 in order to maintain the desired acceleration of the airflow. The distance is therefore related to the resonance frequency of the specific medium. For air a suitable resonance frequency is $483/8 = \sqrt{}60.3$ kHz which, at a speed of 80 km/h, corresponds to a wave of 0.372 mm. At an angle $\alpha$ of 45° between grooves 6 and the approach flow direction 8 of the air, this distance is about 0.3 mm. The airflow is displaced in a manner similar to a boat planing over wave tops 2 of approach flow surface 1.

The accelerated tornado airflows 10a, 10b set into motion the air present under airflows 10a, 10b in cavities 4 of the wave-like approach flow surface 1, wherein vortices 12a, 12b are created. The air present between vortices 12a, 12b is set into motion by vortices 12a, 12b, whereby the air present therebetween also accelerates and forms a new vortex 14. While vortices 12a, 12b are bounded on their top side by the accelerated airflows 10a, 10b, relatively slow air, i.e. air not accelerated by grooves 6, is situated above vortex 14.

Because vortex 14 is created due to acceleration of air, an underpressure is created here according to Bernoulli. As a consequence of this underpressure the vortex 14, which is bounded on its top side by slower air 18 present between the accelerated airflows 10a, 10b, will draw this slower air 18 downward as indicated with arrow 16. The boundary layer is hereby suctioned downward and will remain in contact longer. The point of transition from laminar to turbulent flow shifts downstream, which increases the lift.

The air suctioned in by vortex 14 from the slower air 18 between the accelerated flows 10a, 10b will be displaced in vortices 12a, 12b, from where it will eventually be transferred to the accelerated air flows 10a, 10b flowing thereover and be further discharged.

Further grooves (not shown) can also be arranged in cavities 4, which grooves set vortices 12a, 12b into rotation in positively, neutral or negatively helical manner. Further grooves (not shown) which reduce the resistance can be arranged in these grooves.

Figure 3:
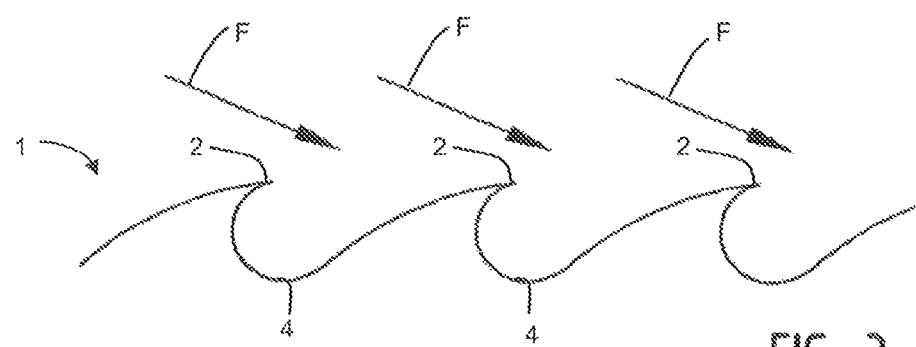
FIG. 3 shows a cross-sectional view of the approach flow surface according to FIG. 1.

FIG. 3 shows a cross-sectional view of the approach flow surface according to FIG. 1. This side view clearly shows the breaking wave form. Wave tops 2 here hang over cavities 4. Such a form of the approach flow surface is particularly advantageous when the fluid F creates an overpressure.

Figure 4:
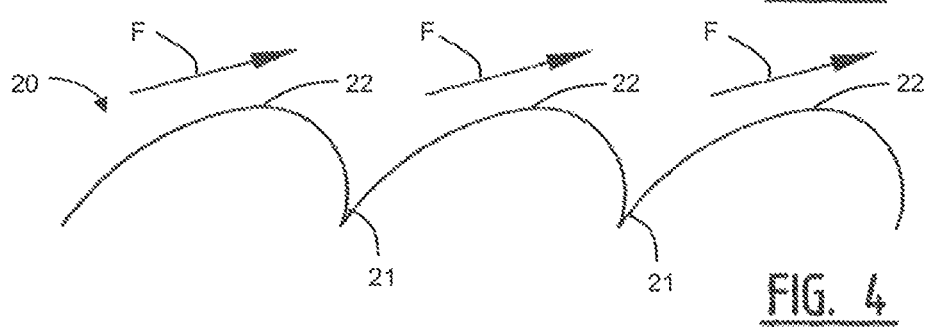
FIG. 4 shows a cross-sectional view of a second embodiment of an approach flow surface.

FIG. 4 shows a cross-sectional view of a second embodiment of an approach flow surface 20 according to the invention. Such an approach flow surface 20 is advantageous when fluid F causes an underpressure on the surface. Because the approach flow surface 20 has a substantially cycloid form in cross-sectional view, fluid can be discharged efficiently in cavities 21. The wave form in FIG. 4 is not exactly the same as a cycloid, but wave tops 22 are shifted slightly, whereby the cycloid form is slightly deformed. This shift of wave tops 22 is necessary since the fluid flows past and does not cause suction directed perpendicularly of the approach flow surface.

Figure 5:
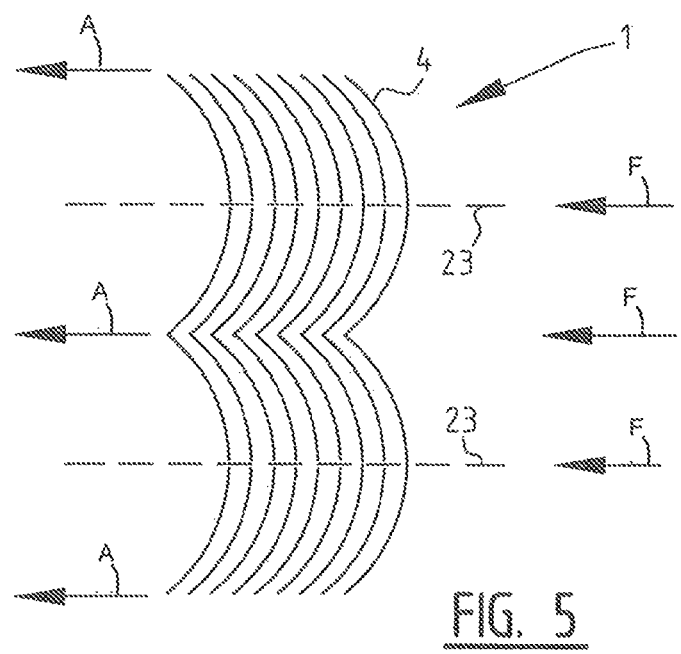
FIG. 5 is a top view of an approach flow surface according to the invention.

FIG. 5 shows an approach flow surface 1 according to the invention. Cavities 4 are shown here as lines. It is apparent herefrom that the cavities in the wave-like approach flow surface 1 are feather-shaped, wherein cavities 4 extend from a central axis 23. It is thus moreover apparent that the feather-shaped configuration of the wave-like approach flow surface is divided into feather-shaped areas lying against each other.

The suctioned-off fluid flowing through cavities 4 enters a kind of gutter at a contact surface with a subsequent feather-shaped area and can then be discharged as fluid flow A in the same direction as fluid F.

Although they show preferred embodiments of the invention, the above described embodiments are intended solely to illustrate the present invention and not in any way to limit the scope of the invention. It is particularly noted that, although the exemplary embodiment is described with air, the invention can also be applied with other fluids such as water. The scope of the invention is therefore defined solely by the following claims.

The invention claimed is:

1. A layer for reducing the friction resistance of a fluid relative to an object, comprising a wave-like approach flow surface repeating in a first direction which comprises means for transporting fluid from a boundary layer of the fluid flowing past to cavities in the wave-like approach flow surface, wherein said means comprises grooves which are provided close to wave tops of the wave-like approach flow surface.

2. The layer as claimed in claim 1, wherein the wave-like approach flow surface comprises a form of breaking waves.

3. The layer as claimed in claim 1, wherein the wave-like approach flow surface substantially takes the form of a cycloid.

4. The layer as claimed in claim 1, wherein the waves of the wave-like surface comprise a wave top which overhangs relative to the cavity situated downstream of the wave top.

5. The layer as claimed in claim 1, wherein the cavities in the wave-like approach flow surface are feather-shaped and extend from a central axis substantially in the plane of the layer.

6. The layer as claimed in claim 1, wherein the wave form varies over the surface of the layer.

7. The layer as claimed in claim 1, wherein the wave comprise a distance between the waves which is adjusted to the resonance frequency and the desired speed of the fluid flowing past.

8. The layer as claimed in claim 1, further comprising means for accelerating the boundary layer of the fluid flowing past.

9. The layer as claimed in claim 8, wherein the means for accelerating the boundary layer of the fluid flowing past comprise a displacing form.

10. The layer as claimed in claim 1, further comprising means for aligning the boundary layer of the fluid flowing past.

11. The layer as claimed in claim 10, wherein the means for aligning the boundary layer of the fluid flowing past comprise grooves arranged in a second direction.

12. The layer as claimed in claim 9, wherein the forms displacing the fluid flowing past form an angle of between 0° and 60° with the approach flow direction of the fluid.

13. The layer as claimed in claim 10, wherein the means for accelerating the boundary layer of the fluid flowing past comprises a displacing form, and wherein the forms displacing the fluid flowing past form an angle of between 0° and 60° with the approach flow direction of the fluid.

14. The layer as claimed in claim 1, further comprising means for ionizing the boundary layer of the fluid flowing past.

15. The layer as claimed in claim 1, further comprising means for ionizing the boundary layer of the fluid flowing past, wherein the means for ionizing the boundary layer of the fluid flowing past comprise an approach flow surface manufactured from Teflon or other thin, hard layer.

16. The layer as claimed in claim 12, wherein the forms displacing the fluid flowing past form an angle of about 45° with the approach flow direction of the fluid.

17. The layer as claimed in 13, wherein the forms displacing the fluid flowing past form an angle of about 45° with the approach flow direction of the fluid.

18. A layer for reducing the friction resistance of a fluid relative to an object, comprising a wave-like approach flow surface repeating in a first direction which comprises means for transporting fluid from a boundary layer of the fluid flowing past to cavities in the wave-like approach flow surface, wherein the cavities in the wave-like approach flow surface are feather-shaped and extend from a central axis substantially in the plane of the layer.

19. The layer as claimed in claim 18, further comprising a plurality of feather-shaped areas lying against each other.

20. The layer as claimed in claim 18, further comprising a gutter at a contact surface with a subsequent feather-shaped area.

21. The layer as claimed in claim 18, further comprising grooves arranged in the cavities.

* * * * *

UNITED STATES PATENT AND TRADEMARK OFFICE
CERTIFICATE OF CORRECTION

PATENT NO.       : 8,535,781 B2                         Page 1 of 1
APPLICATION NO.  : 12/669706
DATED            : September 17, 2013
INVENTOR(S)      : Jacobus Lambertus Van Merksteijn It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 795 days.

Signed and Sealed this
Fifteenth Day of September, 2015

Michelle K. Lee
*Director of the United States Patent and Trademark Office*